United States Patent [19]

Kroeck

[11] 3,734,260

[45] May 22, 1973

[54] STRIP METAL DIMENSION SENSING DEVICE FOR METAL WORKING MACHINES

[76] Inventor: Herbert Kroeck, 90 B Dale Street, West Babylon, N.Y. 11704

[22] Filed: Nov. 15, 1971

[21] Appl. No.: 198,683

[52] U.S. Cl.................................192/127, 200/61.13
[51] Int. Cl........................F16d 71/00, B65h 25/14
[58] Field of Search..................192/127; 200/61.13, 200/61.41, 61.42

[56] References Cited

UNITED STATES PATENTS

| | | | |
|---|---|---|---|
| 2,179,517 | 11/1939 | Pelosi | 192/127 |
| 2,679,307 | 5/1954 | Koch | 192/127 |
| 2,960,731 | 11/1960 | Hogg, Jr. et al. | 192/127 |
| 3,006,450 | 10/1961 | Nash | 192/127 |

Primary Examiner—Allan D. Herrmann
Attorney—Albert F. Kronman

[57] ABSTRACT

A device for sensing the dimensions of a metal strip as it is fed into a metal working machine such as a punch press and thereby controlling the press to prevent damage. Two sensing blocks, one for thickness and one for width, are pivotally mounted on a settable slide and include two rollers which make mechanical contact with the metal strip as it is fed through the device. If the strip is wider or thicker than the set dimensions, the block is rocked through an angle. By gear means, the angle is multiplied and applied to a contact means which closes an electric circuit and stops the metal working machine.

9 Claims, 6 Drawing Figures

Patented May 22, 1973
3,734,260
2 Sheets-Sheet 1
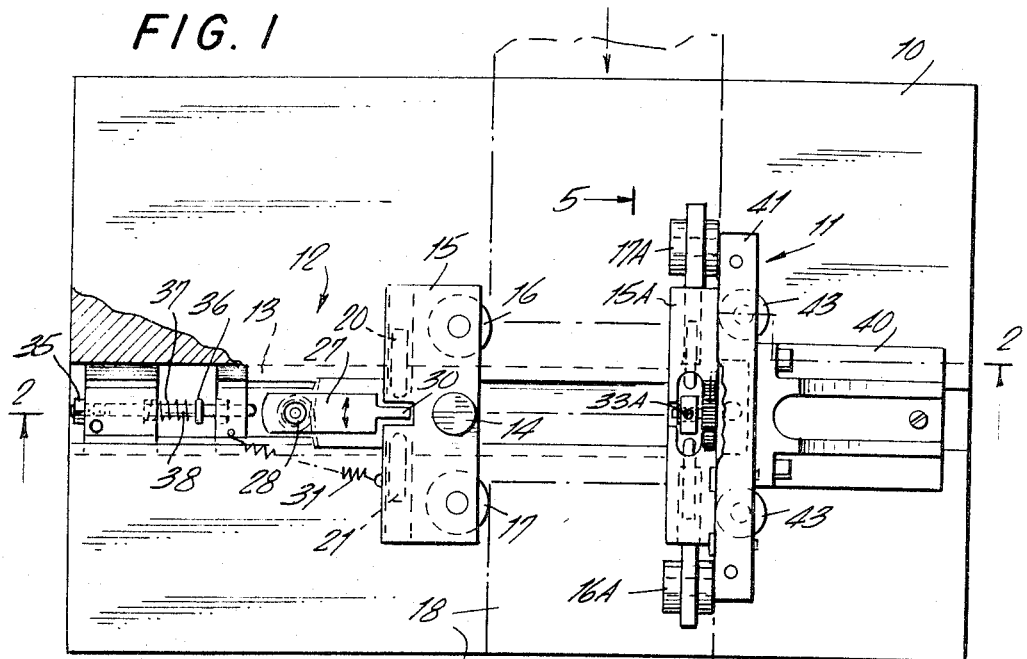
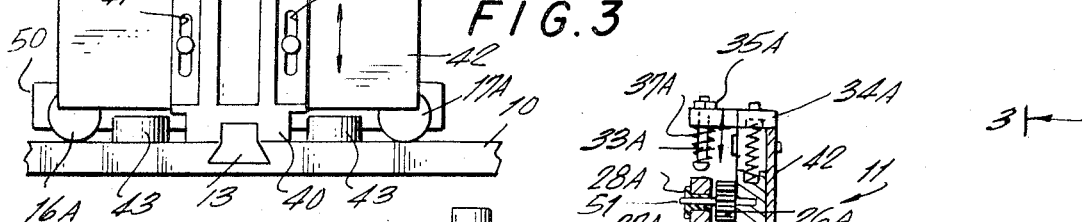
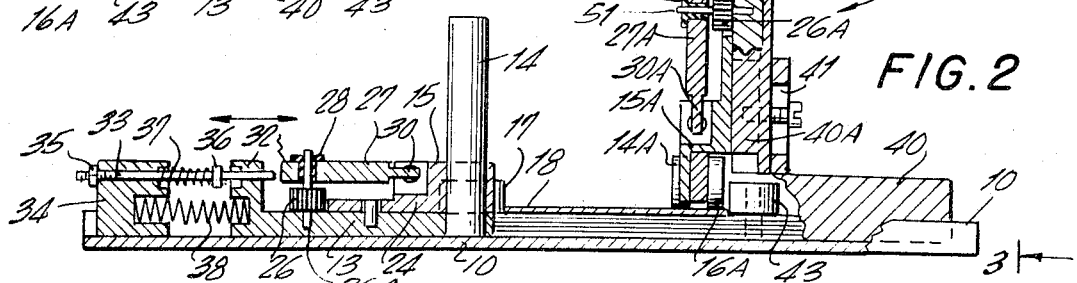
INVENTOR.
HERBERT KROECK
ATTORNEY Patented May 22, 1973  3,734,260

INVENTOR.
HERBERT KROECK

BY
ATTORNEY

STRIP METAL DIMENSION SENSING DEVICE FOR METAL WORKING MACHINES

BACKGROUND OF THE INVENTION

Devices for sensing improper dimensions of metal objects are known and have been used for some time in connection with metal working machines. Generally, the sensing devices have included a simple make-or-break electrical contact to control a relay and a stop means to prevent damage to the machines. Such measuring devices are not very sensitive an do not have the flexibility to handle large over-sized objects. The present invention employs a compact rockable block arrangement which can be used to sense objects that are too large or too small. There is a fail safe sliding means which can accommodate objects that are quite large without damage to the sensing means.

A feature of the invention is the sensitivity of the device, providing a large movement of the contact means with a small movement of the roller which bears on the object.

Another feature of the invention is the ability of contact means to retract under excessive movements. This feature is made possible by mounting the contacts at the ends of long springs in piston-like barrels.

For a better understanding of the present invention, together with other details and features thereof, reference is made to the following description taken in connection with the accompanying drawings.

BRIEF DESCRIPTION OF THE FIGURES

FIG. 1 is a plan view of the sensing device.

FIG. 2 is a cross sectional view of the sensing device shown in FIG. 1 and is taken along line 2—2 of that figure.

FIG. 3 is an end view of the sensing device shown in FIG. 2 and is taken along line 3—3 of that figure.

FIG. 6 is a schematic diagram of connections showing how the sensing device is coupled to a load.

DESCRIPTION OF THE PREFERRED EMBODIMENT

Figure 4:
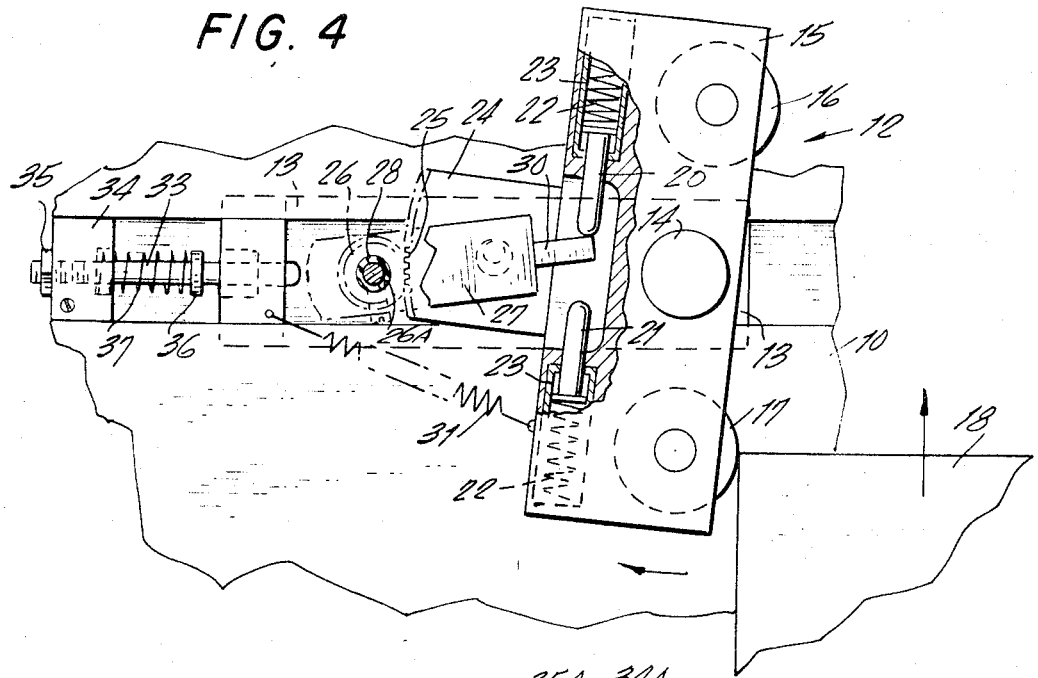
FIG. 4 is a plan view, to an enlarged scale, of a portion of the sensing device, showing the details of the width sensing mechanism.

Referring now to the figures, the sensing means is mounted on a rectangular base 10 which is preferrably a flat metal plate. Near one end of the base 10 is the thickness sensing device 11 and at the opposite end is the width sensing device 12. The width sensing device 12 is mounted on a dove-tailed slide 13 which is secured at one end to pivot bar 14. Rockably mounted on the pivot bar 14 is a sensing block 15 and rotatably secured to the bar are two rollers 16, 17, designed to make contact with an object 18, such as a strip of metal the width of which is to be sensed. Also carried by the block 15 are two spaced, opposed contact devices 20 and 21 (Best shown in FIG. 4). These devices each comprise a cylindrical conductive member slidably carried within a bore 23 in the block 15. A helical spring 22 urges each of the conductive members 20, 21, toward each other at all times. A first metal large gear segment plate 24 is secured to the lower surface of block 15 and rotates with it. Gear segment plate 24 is provided with a plurality of gear teeth 25 at its outer periphery which mesh with the teeth on a pinion gear 26, freely journaled in slide 13, (See FIG. 2). The gear ratio between the gear segment 24 and the pinion gear 26 is such that a small movement of the gear segment 24 will be multiplied into a large movement of the pinion gear. A lever 21 is secured to the pinion gear shaft 26a by means of an insulator bushing 28 and has a metal contact extension pin 30, positioned between contact members 20, 21. Sensing block 15 is resiliently biased by a helical spring 31 to normally hold extension pin 30 against contact 20 as shown in FIG. 4.

The dove-tailed slide 13 is formed with an upwardly extending portion 32 at its end opposite the pivot bar 14. The upwardly extending portion 32 is transversely bored to freely receive and guide a second contact pin 33. The second contact pin 33 is also slidably held in a block 34 bolted to the base 10. The pin 33 extends through the block 34 and its outer portion is threaded. An adjustable nut 35 is mounted at the outer end of pin 33 and is used to set the pin at a position where a desired width of strip 18 may be sensed. A flange 36 is formed on pin 33 to act as a stop for coil spring 37, which is disposed about the pin 33 between the flange 36 and the block 34. A coil spring 38 is mounted between the slide 13 and block 34. The coil spring 38 is compressed to urge the width sensing device toward the strip 18 at all times.

The operation of this portion of the device is as follows: Prior to feeding the strip 18, spring 31 biases block 15 so that contact extension pin 30 makes electrical contact with the conductive cylinder 20. This contact closes a circuit through a relay winding 45, to open another contact and stop the machine action. When the sheet 18 to be sensed is fed into the sensing means, both rollers 16, 17 come in contact with the edge of the strip and, if the sheet has parallel edges, the sensing block 15 is moved to the position shown in FIG. 1. At this position extension pin 30 does not make contact with either conductive cylinder 20 or 21 and the relay 45 is normalized, closing its contacts and energizing the machine or load 48. These conditions prevail as long as the strip 18 is of the desired width while passing through the device. If the strip width slowly increases, the block 15 will be force outwardly until contact is made between the rear surface of lever 27 and pin 33, activating the relay and stopping the machine. If a rough edge or sudden width change is sensed, so that the block 15 is rotated through a small angle, lever 27 is turned, by the multiplying action of the segment 24 upon the pinion 26, making contact between extension pin 30 and one of the cylinders 20, 21, again stopping the machine. If the strip 18 becomes undersized, the spring 31 will rotate the block 15 causing the pin 30 to contact the conductive cylinder 20 to stop the metal working machine.

Figure 5:
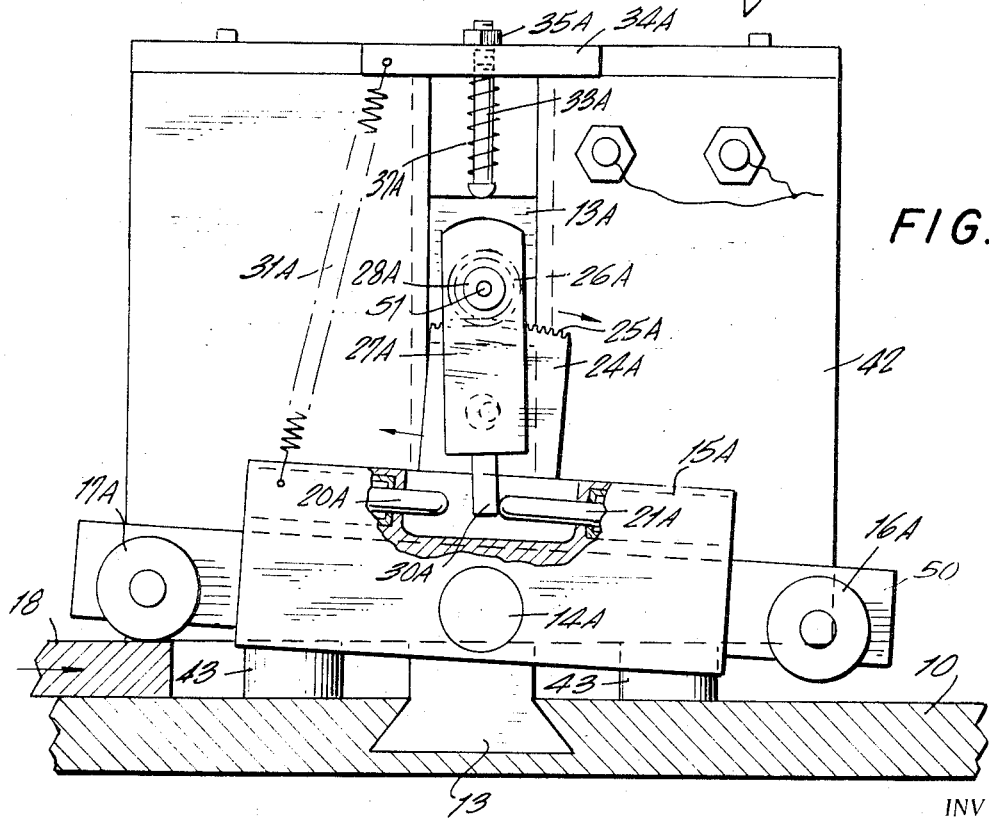
FIG. 5 is a side view, similar to FIG. 5, of another portion of the sensing device, showing the details of the thickness sensing mechanism.

The vertical or thickness sensing device 11 is similar to the horizontal or width sensor 12 except that it is mounted at right angles to the base plate 10. An angular support bracket 40 is secured in the dove-tailed slot in the base 10 and is formed with two slots 41 in its upstanding portion 40a for vertical adjustment. A supporting plate 42 is secured to the angular support 40 by two bolts in slots 41 (See FIG. 3). The vertical sensing device 11 includes a slide 13a (See FIG. 5), sliding in a dove-tailed slot and a rockable sensing block 15a pivoted about a pivot bar 14a. Two rollers 16a and 17a carried upon a bar 50 are coupled to block 15a and are positioned so that the strip 18 to be sensed engages both of them in sequence. Block 15a includes two spaced, opposed contact cylinder members 20a and 21a. As before, these contact members are urged toward each other by springs (not shown). A gear plate segment 24a is secured to the sensing block 15a and is provided with gear teeth 25a. A pinion gear 26a meshes with the teeth 25a and is mounted on a shaft 51 which is secured to an insulator bushing 28a and a lever 27a having a contact extension pin 30a positioned between the two contact members 20a and 21a. The thickness sensing device 11 also includes a threaded vertical contact pin 33a, slidably mounted in a plate 34a and urged downwardly by a spring 37a. An adjustable nut 35a is received upon the upper end of pin 30a. Two limiting rollers 43 are mounted on vertical stub shafts in the base 10 and extend below the thickness sensing device 11 for positioning the right hand edge of strip 18 as seen in FIG. 2.

The operation of the vertical sensing means is the same as the horizontal sensing means. Spring 31a connected between the plate 34a and the block 15a biases the block 15a so that extension pin 30a is in contact with cylindrical contact member 21a. Then the strip 18 to be measured is fed into the sensing device making contact with rollers 17a and 16a. At this time extension pin 30a is half way between contact members 20a and 21a so that the relay 45 is not actuated and the stamping machine 48 can function. An increase in thickness of the strip 18 raises the block 15a, closes the gap between pin 33a and lever 27a and actuates the relay 45. Also, a small change in thickness is sensed by the two rollers 16a, 17a and extension pin 30a is moved to the right of left to make contact with one of the contact members 20a, 21a, and stop the machine. Here again, a small change in thickness is multiplied by the gear segment 24 and pinion gear 26.

There are many relay circuits which can be used with this sensing device. FIG. 6 shows one circuit where all the contact members 20, 21, 20a, 21a, and the pins 33, 33a, are grounded while the two levers, 27 and 27a, are connected in series with a winding 45 of a relay having a pair of normally closed contacts 46. The other side of the relay winding is connected in series with a source of potential 47 and ground. Contacts 46 are connected to a load 48 which may have its own control circuit and its separate source of electrical power.

Having thus fully described the invention, what is claimed as new and desired to be secured by Letters Patent of the United States, is:

1. A strip dimension sensing device for metal working machines comprising a support base to receive strip metal, at least one rockable sensing block pivotally secured to the support base, at least one roller on said block for making contact with the strip metal, spaced, opposed, electrical contact members slidably carried by the block, a rockable lever, a conductive contact pin extending from said lever positioned between the two electrical contact members, an electrically insulated pivot means supporting the rockable lever, gear means coupling the sensing block to the rockable lever and making contact between the contact pin and one of the electrical contact members when the sensing block is rotated through an angle greater than a predetermined amount, and an electrical control circuit connected between the rockable lever and the metal working machine whereby over or under limit strip dimensions will interrupt the machine operations and prevent machine damage.

2. A device according to claim 1 in which the block is spring loaded in the direction of the oncoming strip at all times.

3. A device according to claim 1 in which the gear means coupling the sensing block to the rockable lever is a mechanical motion multiplier.

4. A device according to claim 3 in which the gear means comprises a large gear segment in mesh with a small pinion gear.

5. A device according to claim 1 in which the sensing block is elongated and provided with a roller spaced from each end thereof.

6. A device according to claim 1 in which the block is laterally slidable within the support base and the support base is provided with a second contact pin disposed in the path of the block.

7. A device according to claim 6 in which the block is spring loaded in the direction of the strip being sensed.

8. A device according to claim 1 in which the support base is substantially L-shaped, a first and second rockable sensing block is carried upon the vertical and horizontal portions of the L-shaped base, a roller is freely carried at each end of the sensing blocks in the path of the strip to be sensed, spaced opposed, electrical contact members are carried by each of the blocks, a rockable lever is secured to each of the blocks, a conductive contact pin extends from the said lever between the block carried contact members, an electrically insulated pivot means supports the rockable lever on each of the blocks, gear means couples each of the sensing blocks to the rockable lever, and an electrical control circuit is connected between each of the rockable levers and the metal working machine, whereby over or under limit strip dimensions will interrupt the machine operations.

9. A device according to claim 8 in which the horizontal sensing block is horizontally slidable within the support base and the vertical sensing block is vertically slidable within the vertical portion of the support base and the ends of the vertical and horizontal portions of the support base are each provided with a contact pin disposed in the path of each of the blocks.

* * * * *